US012690565B2

(12) United States Patent
Claeys et al.

(10) Patent No.: US 12,690,565 B2
(45) Date of Patent: Jul. 28, 2026

(54) ANIMAL TRAINING DEVICE WITH POSITION RECOGNIZING CONTROLLER

(71) Applicants: Brian Claeys, Grapevine, TX (US); Travis Lux, Irving, TX (US); Greg Van Curen, Fremont, IN (US)

(72) Inventors: Brian Claeys, Grapevine, TX (US); Travis Lux, Irving, TX (US); Greg Van Curen, Fremont, IN (US)

( * ) Notice: Subject to any disclaimer, the term of this patent is extended or adjusted under 35 U.S.C. 154(b) by 477 days.

(21) Appl. No.: 17/223,636

(22) Filed: Apr. 6, 2021

(65) Prior Publication Data

US 2022/0312735 A1 Oct. 6, 2022

(51) Int. Cl.
*A01K 15/02* (2006.01)
*A01K 5/01* (2006.01)

(52) U.S. Cl.
CPC .......... *A01K 15/021* (2013.01); *A01K 5/0114* (2013.01)

(58) Field of Classification Search
CPC ...... A01K 5/0114; A01K 15/021; A01K 5/02; A01K 5/00; A01K 15/00
See application file for complete search history.

(56) References Cited

U.S. PATENT DOCUMENTS

| | | | | |
|---|---|---|---|---|
| 6,263,836 | B1 * | 7/2001 | Hollis | A01K 15/021 119/712 |
| D782,125 | S | 3/2017 | Tseng et al. | |
| 9,737,049 | B2 * | 8/2017 | Trottier | A01K 5/0291 |
| 10,028,488 | B2 | 7/2018 | Hsu et al. | |
| 10,231,442 | B1 | 3/2019 | Chang et al. | |
| 10,398,127 | B2 * | 9/2019 | Hu | A01K 5/0283 |
| 2003/0154930 | A1 * | 8/2003 | Maddox | A01K 15/021 119/720 |
| 2011/0311109 | A1 * | 12/2011 | Demarais | G06T 7/0012 382/110 |
| 2012/0272912 | A1 * | 11/2012 | Hofman | A01K 1/0103 119/14.08 |
| 2012/0288160 | A1 * | 11/2012 | McVey | A01K 29/00 382/110 |
| 2016/0110383 | A1 * | 4/2016 | Mowry | A01K 15/021 707/758 |
| 2017/0251633 | A1 * | 9/2017 | Womble | A01K 5/02 |
| 2019/0357497 | A1 * | 11/2019 | Honchariw | A01K 15/021 |
| 2020/0352136 | A1 * | 11/2020 | Hanson | G16H 50/20 |
| 2021/0153456 | A1 * | 5/2021 | Mundell | A01K 15/021 |

\* cited by examiner

*Primary Examiner* — Joshua D Huson
*Assistant Examiner* — Spencer T Callaway
(74) *Attorney, Agent, or Firm* — TAYLOR & EDELSTEIN, PC

(57) ABSTRACT

An animal training device includes: a housing; an imaging device associated with the housing to capture an image and output an imaging signal corresponding to the captured image; an audio output device associated with the housing to receive an audio signal and produce a training sound responsively to the received audio signal; and a controller operably coupled to the imaging device and the audio output device. The controller is configured to: initiate an animal training protocol; output the audio signal so the audio output device produces the training sound; receive the imaging signal after outputting the audio signal; analyze the received imaging signal to determine if an animal is present in the captured image in a defined position including at least one of a defined location or a defined orientation; and output a reward signal to reward the animal if the animal is in the defined position.

20 Claims, 6 Drawing Sheets

ANIMAL TRAINING DEVICE WITH POSITION RECOGNIZING CONTROLLER

BACKGROUND OF THE INVENTION

1. Field of the Invention

The present invention relates to animal training devices, and, more particularly, to animal training devices with controllers.

2. Description of the Related Art

Training animals requires consistency and repetition. In this respect, properly training an animal can be a large time obligation and, if not performed correctly, can be frustrating to both the animal and its owner. Traditional animal training techniques generally focus on rewarding desired behaviors, e.g., providing praise when the animal performs the correct action in response to a command, and correcting undesired behaviors, e.g., scolding the animal when the animal does not perform the correct action in response to the command. For many animal owners, it is difficult to train their animal when the owner is away from home and/or attending to other obligations.

What is needed in the art is a way to train an animal that can be performed with minimal, if any, human interaction required.

SUMMARY OF THE INVENTION

The present invention provides an animal training device with a controller that can analyze an imaging signal to determine if an animal is present in a captured image in a defined position and output a reward signal to reward the animal if the animal is in the defined position.

The invention in one form is directed to an animal training device including: a housing; at least one imaging device associated with the housing and configured to capture an image and output an imaging signal corresponding to the captured image; an audio output device associated with the housing and configured to receive an audio signal and produce a training sound responsively to the received audio signal; and a controller operably coupled to the at least one imaging device and the audio output device. The controller is configured to: initiate an animal training protocol; output the audio signal to the audio output device so the audio output device produces the training sound; receive the imaging signal after outputting the audio signal; analyze the received imaging signal to determine if an animal is present in the captured image in a defined position, the defined position including at least one of a defined location or a defined orientation; and output a reward signal to reward the animal if the animal is in the defined position in the captured image.

An advantage of the present invention is the animal training device can reward the animal for being in the defined position without an owner or trainer needing to be present, which can help reinforce desired behavior training of the animal.

Another advantage is the animal training device can be configured to use the animal owner's voice as the training sound so the animal is trained to respond to the owner.

Yet another advantage is the animal training device can be configured in many different ways to reward the animal, e.g., using treats, praise, toys, etc., depending on what effectively motivates the animal.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
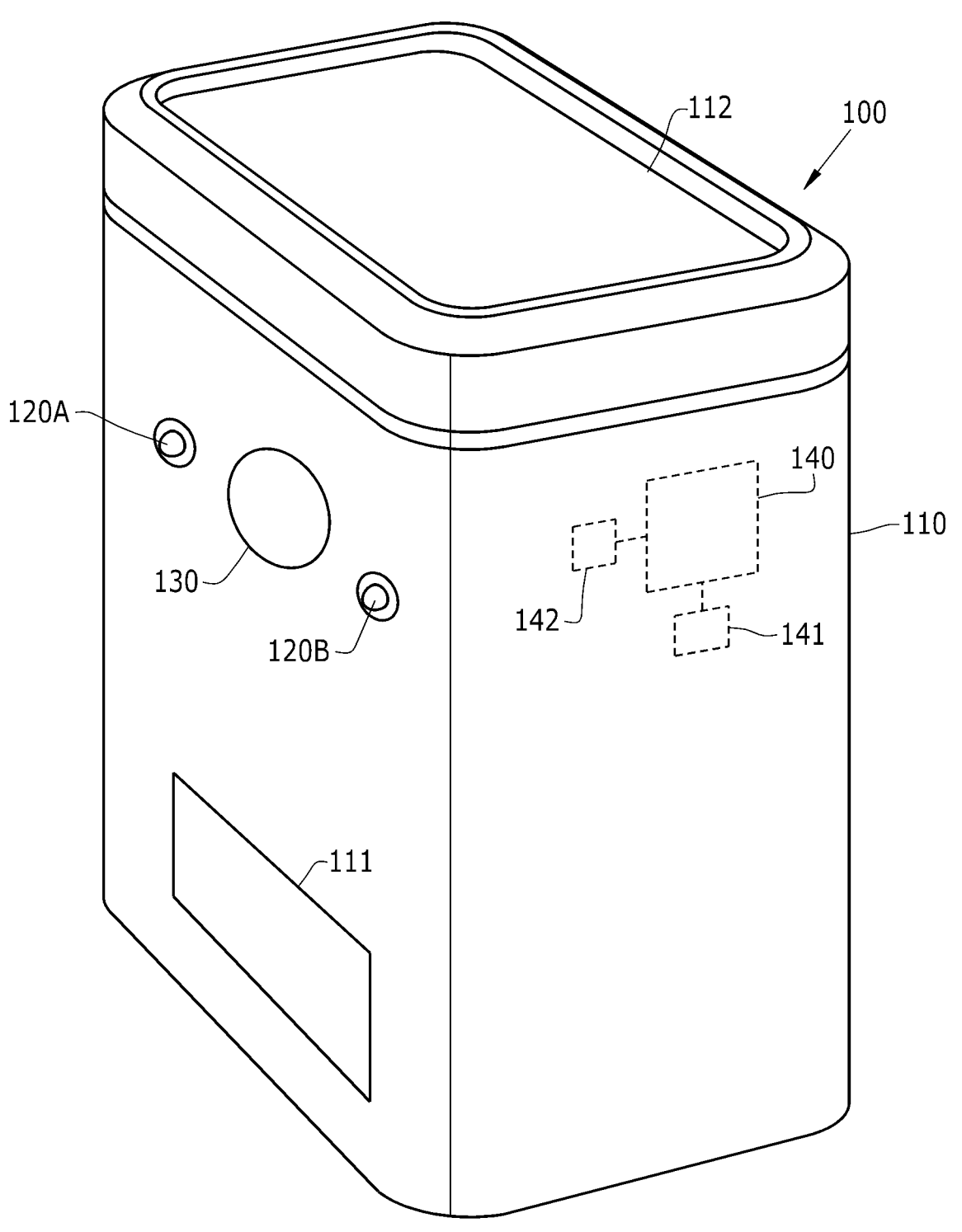
FIG. 1 is a perspective view of an exemplary embodiment of an animal training device provided according to the present invention.

Referring now to the drawings, and more particularly to FIG. 1, there is shown an exemplary embodiment of an animal training device 100 provided according to the present invention which generally includes a housing 110, at least one imaging device, illustrated as two imaging devices 120A, 120B, an audio output device 130, and a controller 140. The imaging device(s) 120A, 120B and the audio output device 130 are both associated with the housing 110, e.g., held by the housing 110 so the imaging devices 120A, 120B and the audio output device 130 are exposed to an exterior of the housing 110, while the controller 140 may be disposed in the housing 110 to protect the controller 140 from damage. The imaging devices 120A, 120B and the audio output device 130 may be scratch-resistant, e.g., by being at least partially covered by a scratch-resistant material such as glass, and waterproof to resist damage due to an animal licking the devices 120A, 120B, 130 or otherwise contacting the devices 120A, 120B, 130 with liquid. As illustrated, the housing 110 may generally be in the shape of a rectangular box, but it should be appreciated that the shape of the housing 110 can be adjusted in a variety of ways according to the present invention. The housing 110 may have a removable top 112 that allows access into the interior of the housing 110. The housing 110 may comprise a variety of materials, including but not limited to metals such as aluminum or steel, or polymers such as polyvinylchloride (PVC), polyethylene, and/or polypropylene.

The imaging devices 120A, 120B are configured to capture an image and output an imaging signal corresponding to the captured image. In some embodiments, the captured image is a single image capture, but it should be appreciated that the captured image may also be a video capture of a defined duration. The imaging devices 120A, 120B may be directed in front of the animal training device 100 to capture images of an animal, as will be described further herein. In some embodiments, the imaging devices 120A, 120B include an optical camera configured to capture optical images and/or a thermal camera configured to capture thermal images. Including a thermal camera, for example, may help differentiate an animal, which produces body heat, from an object, such as an animal-shaped toy. In some embodiments, the imaging devices 120A, 120B may be the same type of imaging device, such as optical cameras, and spaced apart from one another to generate three-dimensional images as a composite of two-dimensional images. It should thus be appreciated that the imaging devices 120A, 120B described herein are exemplary only, and a wide variety of imaging devices may be utilized to capture images according to the present invention.

The audio output device 130 is associated with the housing 110 and configured to receive an audio signal and produce a training sound responsively to the received audio signal. The audio output device 130 may, for example, be a speaker that converts the audio signal into sounds, as is well-known. In some embodiments, the audio output device 130 is configured to produce sounds in an auditory range that is greater than what humans can hear. For example, the audio output device 130 may be configured to produce sounds in an auditory range that non-human animals, such as dogs, cats, horses, pigs, non-human primates, etc. can hear. It should thus be appreciated that the audio output device 130 may be configured in a wide variety of ways to produce sounds that can be used to train an animal.

Figure 2:
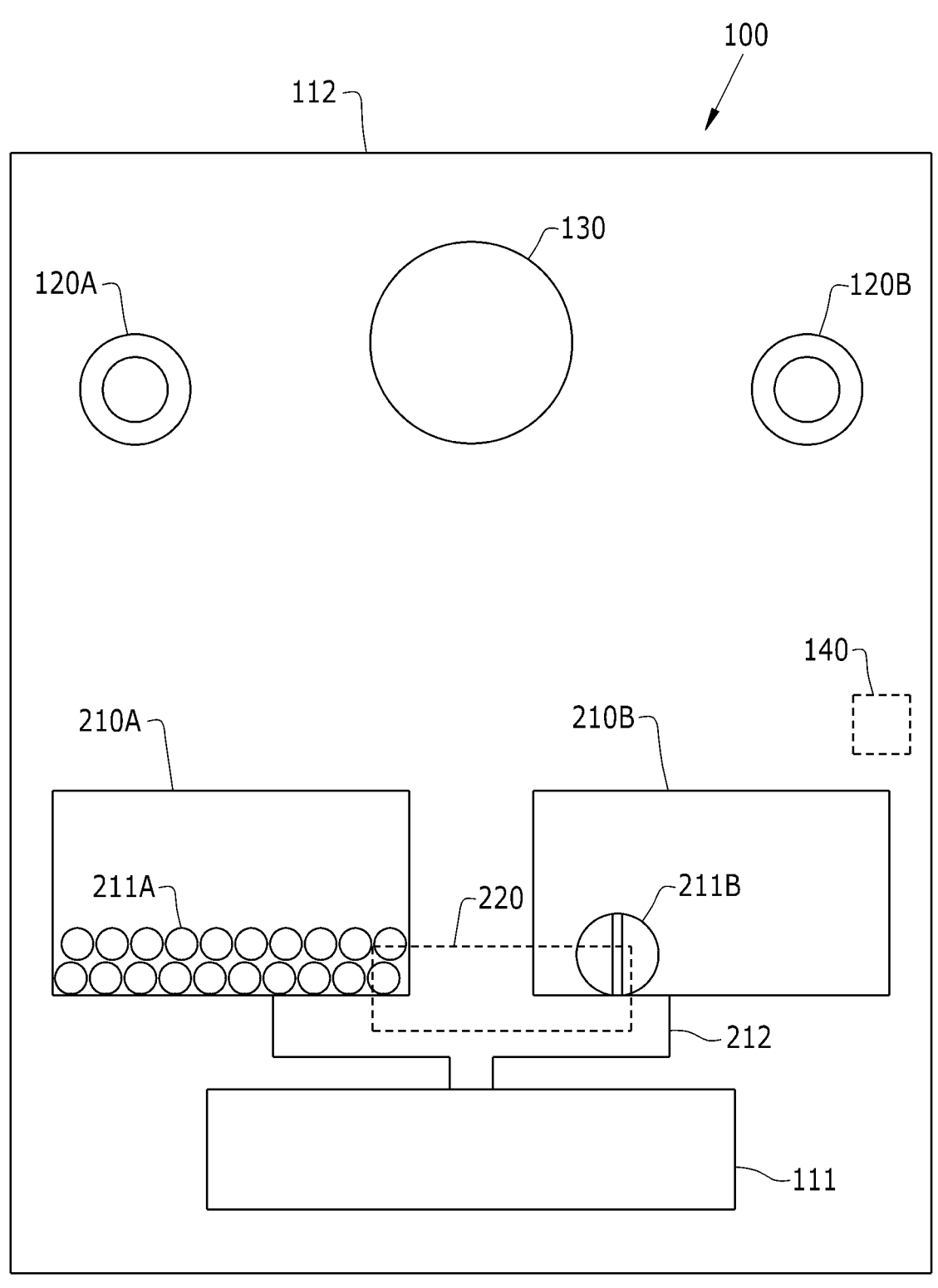
FIG. 2 is a schematic view of an interior of the animal training device illustrated in FIG. 1.

Referring still to FIG. 1, and referring now to FIG. 2 as well, it is illustrated that the controller 140 is operably coupled to the imaging devices 120A, 120B and the audio output device 130. The controller 140 may be operably coupled to the devices 120A, 120B, 130 via a wired connection or wirelessly so the controller 140 can receive the audio signal from the audio output device 130 and the imaging signal from the imaging devices 120A, 120B. The controller 140 may be operably coupled to a memory 141, which may store instructions in the form of software that the controller 140 executes as well as other data, as will be described further herein. The controller 140 may also be coupled to a communication module 142 that is configured to output and receive signals from a remote device outside the animal training device 100. The remote device may be, but is not limited to, a networking device such as a router and/or a remote computing device such as a smartphone or a tablet. The communication module 142 may be configured to couple to the remote device using a wired or wireless connection. Any type of suitable connection may be used to couple the remote device to the controller 140 via the communication module 142, including but not limited a wired communication standard connection such as a universal serial bus (USB) connection or a wireless communication standard connection such as BLUETOOTH® or wireless fidelity (WiFi).

Figure 3:
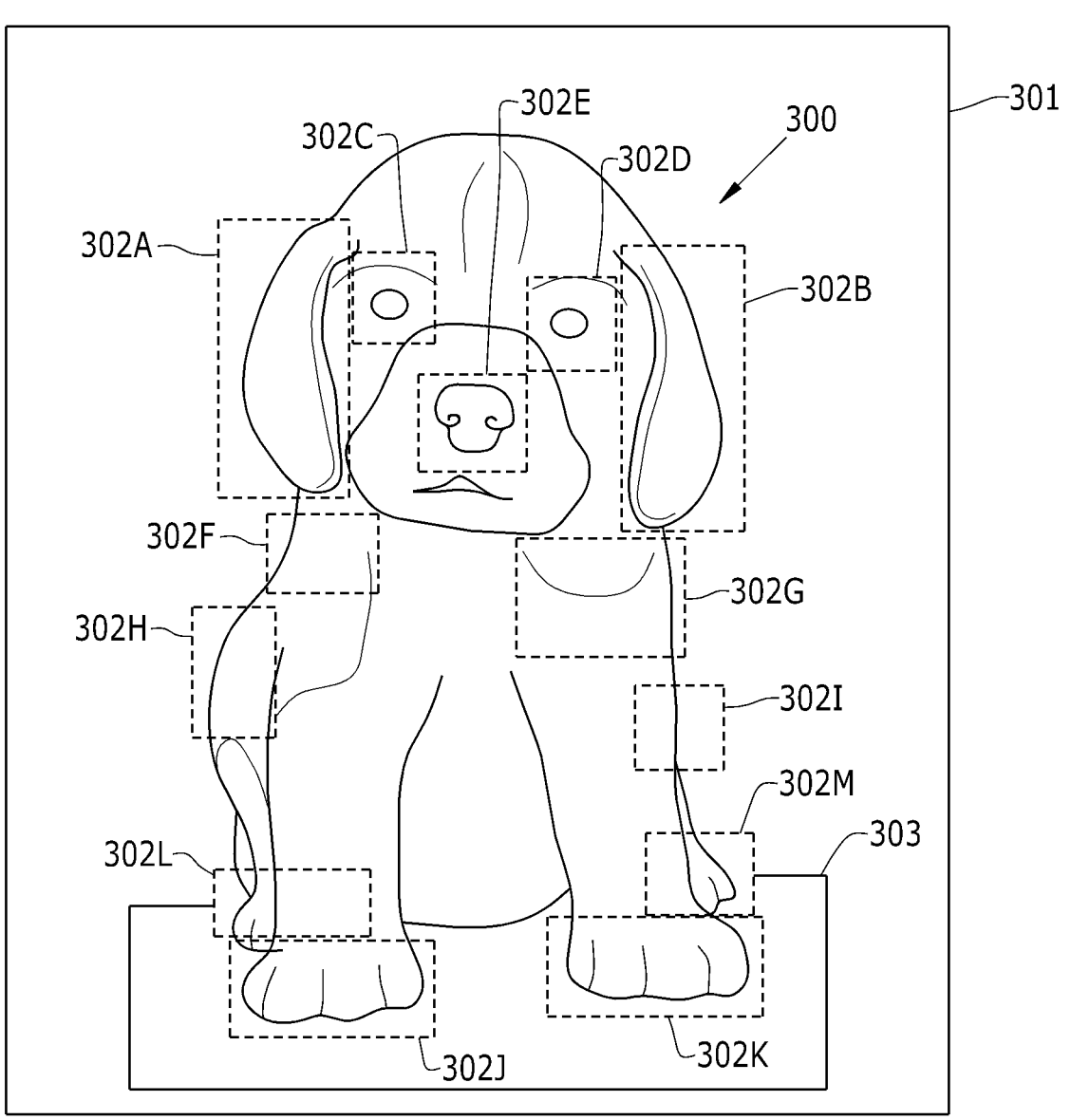
FIG. 3 is an illustration of an animal in a defined position in a captured image.
Figure 4:
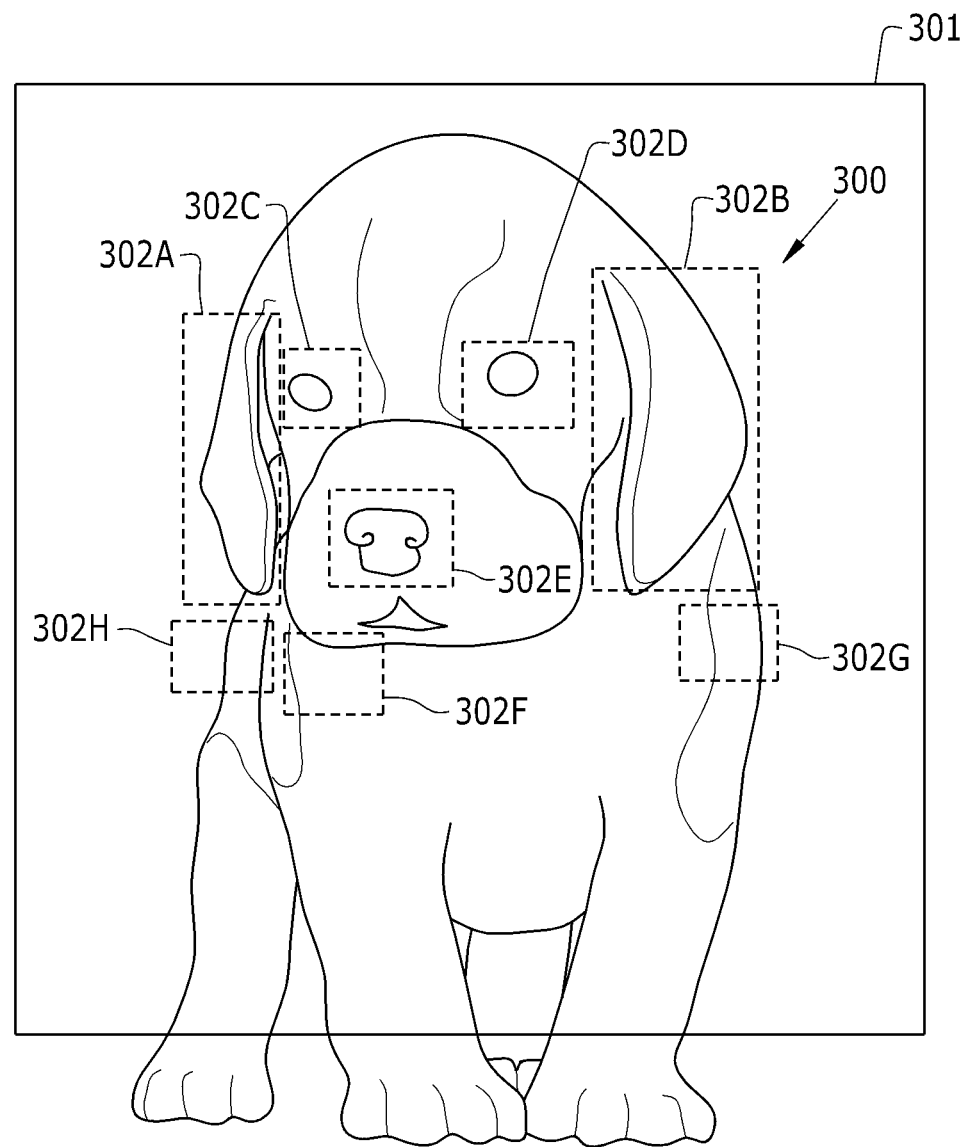
FIG. 4 is an illustration of the animal of FIG. 3 when the animal is not in the defined position in a captured image.

Referring now to FIGS. 3 and 4, it is illustrated how the controller 140 may initiate an animal training protocol to encourage desired behavior of an animal, which is illustrated as a dog 300. It should be appreciated that while the trained animal is illustrated and described as a dog, the animal training device 100 may be used to train other animals, including but not limited to: other species of the Canidae family, such as foxes; species of the Felidae family, such as cats; species of the Equidae family, such as horses; species of the Suidae family, such as pigs; or primates. The controller 140 is configured to initiate an animal training protocol to begin a sequence of events to get the animal to perform a desired behavior, such as getting into a defined position. The controller 140 may be configured to initiate the animal training protocol upon receiving a protocol initiation signal, which may be received by the controller 140 via the communication module 142 or from an element of the animal training device 100 such as a touchscreen display. Alternatively, or in addition, the controller 140 may be configured to initiate the animal training protocol at a defined protocol initiation time and/or at defined protocol initiation time intervals. For example, the controller 140 may be configured to initiate the animal training protocol at one or more specific times each day, e.g., at 9:30 AM, 1:30 PM, and 3:30 PM, and/or with a defined time interval between other initiations of the protocol, e.g., every 8 hours. It should thus be appreciated that the controller 140 may be configured to initiate the animal training protocol in a variety of different ways.

When the animal training protocol is initiated, the controller 140 may output the audio signal to the audio output device 130 so the audio output device produces a training sound, alerting the animal that the training protocol has begun. In some embodiments, the training sound is a pre-recorded sound that is stored in the memory 141, such as an audio recording of the animal's owner issuing a command. Other possible training sounds include, but are not limited to, clicks, whistling, or any other sound to which the animal is trained to respond. In some embodiments, the controller 140 may receive a remote sound signal from a remote device, such as a smartphone, via the communication module 142 and output a corresponding audio signal to the audio output device 130 so the audio output device 130 recreates the sound that resulted in the remote sound signal, which can allow the animal's owner and/or trainer to communicate with the animal in real-time and/or using pre-recorded sounds.

The controller 140 is configured to receive the imaging signal after outputting the audio signal. After receiving the imaging signal, the controller 140 is configured to analyze the imaging signal to determine if an animal 300 is present in a captured image 301 in a defined position, which is a defined location and/or a defined orientation. For example, referring specifically to FIG. 3, the animal 300 is illustrated in the captured image 301 as being in front of and facing one or both of the imaging devices 120A, 120B, which corresponds to the defined location. Additionally, the animal 300 is illustrated in a sitting orientation, which corresponds to the defined orientation. Since the animal 300 is in the defined position, i.e., both in the defined location and in the defined orientation in the captured image 301, the controller 140 is configured to output a reward signal to reward the animal 300. The reward signal may cause, for example, a praising sound to be produced by the audio output device 130 and/or a reward to be distributed to the animal 300, as will be described further herein. In some embodiments, the controller 140 is configured to determine the animal 300 is in the defined position when the animal 300 is in both the defined location and the defined orientation; alternatively, the controller 140 may be configured to determine the animal 300 is in the defined position when the animal 300 is in the defined location or the defined orientation.

In some embodiments, the controller 140 is configured to determine the animal 300 is present in the captured image 301 in the defined position utilizing an object recognition protocol, which may be stored in the memory 141. The controller 140 may be configured, for example, to analyze the imaging signal to determine if various anatomical features 302A, 302B, 302C, 302D, 302E, 302F, 302G, 302H, 302I of the animal 300 are in respective positions, relative to a reference and/or to one another, within the captured image 301 to correspond to the defined position. In the illustration of FIG. 3, for example, the anatomical features 302A, 302B may correspond to the animal's right ear 302A and left ear 302B, the anatomical features 302C, 302D may correspond to the animal's right eye 302C and left eye 302D, the anatomical feature 302E may correspond to the animal's nose 302E, the anatomical features 302F, 302G may correspond to the animal's front right shoulder 302F and front left shoulder 302G, and the anatomical features 302H, 302I may correspond to the animal's rear right shoulder 302H and rear left shoulder 302I. In some embodiments, the controller 140 is configured to recognize the anatomical features 302A, 302B, 302C, 302D, 302E, 302F, 302G, 302H, 302I using object detection techniques. For the animal 300, for example, the controller 140 may be configured to recognize the anatomical features 302A, 302B, 302C, 302D, 302E, 302F, 302G, 302H, 302I in the captured image 301 based on the coloring and shape of the various anatomical features, e.g., the color distribution of the pixels corresponding to the animal's fur and tissues. In some embodiments, the controller 140 is configured to utilize a combination of optical and thermal images for object detection. For example, the controller 140 may be configured to recognize the ears 302A, 302B based on not only the color distribution of pixels corresponding to the ears 302A, 302B, but also based on a thermal profile of the ears 302A, 302B, which may be relatively heterogeneous and/or different than other parts of the animal 300 due to heat dispersion. It should thus be appreciated that the controller 140 may be configured in a wide variety of ways to analyze the captured image 301 to identify the position of the animal 300.

As can be appreciated from FIG. 3, the animal's ears 302A, 302B, eyes 302C, 302D, and nose 302E are centered in the captured image 301 and facing the imaging devices 120A, 120B, indicating that the animal 300 is facing the imaging devices 120A, 120B in the defined location. In some embodiments, the controller 140 is configured to recognize a reference, such as an animal bed 303, in the captured image 301 and compare the position of the anatomical features 302A, 302B, 302C, 302D, 302E, 302F, 302G, 302H, 302I to the reference 303 in order to determine the animal 300 is in the defined location. Alternatively, or in addition, the controller 140 may be configured to recognize that all of the anatomical features 302A, 302B, 302C, 302D, 302E, 302F, 302G, 302H, 302I are present in the captured image 301 and a size scale of one or more of the anatomical features, such as the ears 302A, 302B and the eyes 302C, 302D, correspond to a defined size scale, indicating that the animal 300 is a defined distance from the animal training device 100 and in a defined area, i.e., in the defined location. It should thus be appreciated that the controller 140 may be configured to determine the animal 300 is present in the captured image 301 in the defined location in a wide variety of ways according to the present invention.

The controller 140 may be configured to determine the animal 300 is present in the captured image 301 in the defined orientation in a variety of ways. When the defined position corresponds to the animal 300 sitting, as illustrated in FIG. 3, the controller 140 may be configured to determine the animal 300 is in the defined orientation by comparing the orientation of the anatomical features 302A, 302B, 302C, 302D, 302E, 302F, 302G, 302H, 302I relative to one another. As can be appreciated from FIG. 3, the front shoulders 302F, 302G of the animal 300 are above the rear shoulders 302H, 302I when the animal 300 is sitting. The controller 140 may thus be configured to determine that the animal 300 is in the defined orientation when the front shoulders 302F, 302G are above the rear shoulders 302H, 302I. However, such a condition may also be true when the animal is standing on its hind legs and/or jumping, which can be an undesired behavior. To differentiate between the animal 300 sitting and jumping, the controller 140 may also be configured to determine if additional anatomical features 302J, 302K, 302L, 302M, which correspond to the paws of the animal 300, are in a defined orientation relative to one another; in the case of the animal 300 sitting, the paws 302J, 302K, 302L, 302M should all be at generally the same vertical position, as opposed to the animal 300 jumping or standing on its hindlegs where the rear paws 302L, 302M will tend to be significantly below the front paws 302J, 302K. It should thus be appreciated that the controller 140 may be configured in a wide variety of ways to determine the animal 300 is in the defined position.

In some embodiments, the controller 140 is configured to receive a defined position image signal corresponding to the defined position and define the defined position based on the received defined position image signal. For example, the controller 140 may be configured to receive the defined position image signal from the imaging device(s) 120A, 120B and/or a remote imaging device, such as a smartphone camera. The defined position image signal may correspond to a captured reference image taken by the imaging device(s) 120A, 120B when the animal 300 is in the defined position. After receiving the defined position image signal, the controller 140 may be configured to analyze the defined position image signal to map out what the received imaging signal from the imaging device(s) 120A, 120B should be to determine that the animal 300 is in the defined position in the captured image 301. For example, the controller 140 may be configured to compare the received image signal to the defined position image signal and, based on the similarities and/or the differences between the signals, determine if the animal 300 is in the defined position. It should thus be appreciated that the controller 140 may be configured to determine if the animal 300 is in the defined position in the captured image 301 based solely off the imaging signal, as previously described, or by comparing the imaging signal to other signals.

When the controller 140 determines the animal 300 is in the defined position, the controller 140 outputs a reward signal to reward the animal 300. The output reward signal may cause the animal 300 to be rewarded in a variety of ways. In some embodiments, one or more reward storage reservoirs, illustrated as two reward storage reservoirs 210A, 210B in FIG. 2, are disposed in the housing 110 and configured to store at least one reward. Each storage reservoir 210A, 210B may be configured to store a specific reward type therein, with FIG. 2 illustrating an edible item 211A stored in the storage reservoir 210A and a toy 211B stored in the storage reservoir 210B. As used herein, an "edible item" is any item that can be safely consumed by the animal 300, such as the animal's regular food and/or treats, and a "toy" is any item that is safe for the animal 300 to play with, such as a ball or a stuffed animal. The controller 140 is operably coupled to a reward distributer 220 that is associated with the storage reservoir(s) 210A, 210B. The reward distributer 220 may be a conveyor, such as an auger, actuator, or other element, that is configured to convey the reward(s) 211A, 211B when activated; alternatively, or in addition, the reward distributer 220 may include a selectively activated stop that can be moved to release the reward(s) 211A, 211B from the storage reservoir 210A, 210B. The housing 110 also has a reward opening 111 formed therein, which may be sized to allow the reward(s) 211A, 211B from the storage reservoir(s) 210A, 210B to pass through. The controller 140 may be configured to output the reward signal to the reward distributer 220 so the reward distributer 220 distributes one or more of the rewards 211A, 211B through the reward opening 111.

In some embodiments, the storage reservoirs 210A, 210B are coupled to a reward chute 212 that is coupled to the reward opening 111. In this respect, the reward distributer 220 can convey the rewards 211A, 211B from the respective storage reservoir 210A, 210B to the reward chute 212, with the conveyed reward 211A, 211B then dropping down the reward chute 212 to the reward opening 111 so the reward 211A, 211B is accessible to the animal 300. The reward chute 212 may couple to both of the storage reservoirs 210A, 210B, as illustrated, or each storage reservoir 210A, 210B may couple to a respective reward chute that is coupled to the reward opening 111. In some embodiments, each storage reservoir 210A, 210B has a respective reward distributer associated therewith that is operably coupled to the controller 140 and configured to distribute a reward 211A, 211B from the storage reservoir 210A, 210B upon receiving the corresponding reward signal from the controller 140. For example, the controller 140 may be configured to receive a reward selection signal, from a remote device or elsewhere, that corresponds to a specific reward held in a storage reservoir 210A, 210B being distributed and output the reward signal so the specific reward is distributed to the animal by the reward distributer. It should thus be appreciated that rewards 211A, 211B from the storage reservoirs 210A, 210B can be provided to the animal 300 in a wide variety of ways according to the present invention.

In some embodiments, the controller 140 is configured to also output the reward signal to the audio output device 130 to produce a reward sound in addition to a reward being distributed from the storage reservoir(s) 210A, 210B. In this respect, the animal training device 100 can be used so an animal associates both rewarding sounds, such as praise, and physical rewards, such as treats, to assuming the defined position. The controller 140 may be configured to generate a reward sound signal based on a received sound signal, which may come from a remote device. For example, the controller 140 may be configured to generate a reward sound signal based on a received signal from a remote device or the memory 141 that corresponds to the animal owner's voice providing praise, which may be output to the audio output device 130 to recreate the animal owner praising the animal in the animal owner's voice. Many animals recognize the voices of their owners, so recreating the voice of the animal owner praising the animal may more effectively reinforce good behaviors by the animal. In some embodiments, data corresponding to the reward sound signal and/or the reward sound is input into and stored in the memory 141 and the controller 140 is configured to recall the stored data for outputting to the audio output device 130 when outputting the reward signal.

As previously described, the animal training device 100 may include a communication module 142 that is operably coupled to the controller 140. The communication module 142 is configured to receive signals from a remote device, output received signals from the remote device to the controller 140, receive controller signals from the controller 140, and output the received controller signals to the remote device. The communication module 142 may be configured to wirelessly receive signals from the remote device and wirelessly output the received controller signals to the remote device. The communication module 142 may thus allow an owner or other user to remotely use the animal training device 100 to train the animal 300. The animal owner may, for example, set the defined position for the animal 300 to be rewarded and/or choose how the animal is rewarded. In some embodiments, the controller 140 is configured to output the reward signal to a remote device, which may have a corresponding application running, via the communication module 142. Upon the remote device receiving the reward signal, the remote device user may be prompted to select how the animal 300 should be rewarded. The remote device may then output a reward selection signal, which corresponds to a specific reward, to the controller 140 via the communication module 142, with the controller 140 then generating the reward signal to correspond to the specific reward based on the received reward selection signal and cause the animal 300 to be rewarded according to the reward selected by the remote device user. In some embodiments, the imaging device(s) 120A, 120B is also operably coupled to the communication module 142, either directly or via the controller 140, and the communication module 142 is configured to receive the imaging signal and output the received imaging signal to the remote device. Outputting the imaging signal to the remote device allows the remote device user, which may be the animal's owner, to watch how the animal 300 behaves, which can be useful in making decisions on how to train the animal 300.

In some embodiments, and referring now to FIG. 4, the controller 140 is further configured to determine the animal 300 is not in the defined position in the captured image 301 and output a corrective signal responsively to determining the animal 300 is not in the defined position. For example, the controller 140 may output the corrective signal to the audio output device 130 so the audio output device 130 produces a corrective sound, which may be a sound that the animal 300 associates with bad behavior, responsively to receiving the corrective signal. Alternatively, or in addition, the controller 140 may output the corrective signal to a remote device, such as an electronic collar worn by the animal 300, so the remote device performs an action to promote corrective behavior by the animal 300, e.g., by producing a noise and/or delivering an electric shock to the animal 300.

To determine if the animal 300 is not in the defined position, the controller 140 may determine the orientation of the anatomical features 302A, 302B, 302C, 302D, 302E, 302F, 302G, 302H, 302I of the animal 300 relative to one another in the captured image 301, similarly to how the controller 140 determines that the animal 300 is in the defined position. As illustrated in FIG. 4, the controller 140 may determine that the shoulders 302F, 302G, 302H of the animal 300 are all at roughly the same vertical position, indicating that the animal 300 is standing. Further, the paws 302I, 302K, 302L, 302M of the animal 300 are missing from the captured image 301, further indicating that the animal 300 is not in the defined position. Based on these factors, the controller 140 may determine that the animal 300 is not in the defined position, e.g., sitting a defined distance from the animal training device 100, and thus output the corrective signal in an attempt to correct the animal's behavior.

In some embodiments, the controller 140 is configured to wait a defined training time period after outputting the audio signal to the audio output device 130 before outputting the corrective signal, in order to give the animal 300 a chance to realize the training protocol has begun and get in the defined position. The defined training time period may be, for example, 30 seconds to 90 seconds, but it should be appreciated that the training time period can be shorter or longer. In some embodiments, the controller 140 is configured to output the audio signal to the audio output device 130 multiple times, so the audio output device 130 produces the training sound multiple times, before waiting the defined training time period before outputting the corrective signal.

Figure 5:
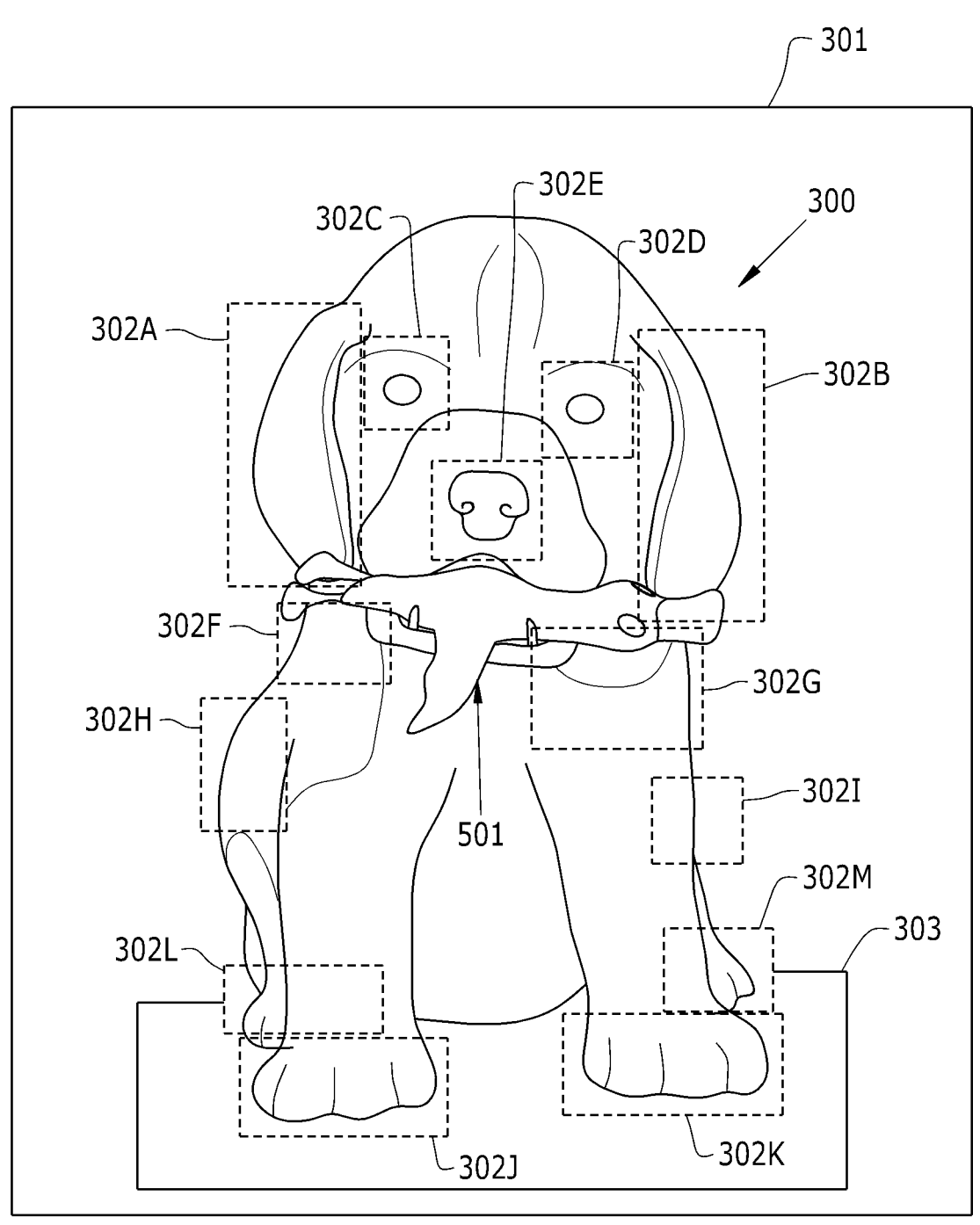
FIG. 5 is an illustration of the animal of FIGS. 3-4 when the animal is in the defined position and an object is present in a captured image.

In some embodiments, and referring now to FIG. 5, the controller 140 is configured to analyze the imaging signal to determine if a defined object 501, illustrated as a toy in the shape of a game bird, is in the captured image 301 and only output the reward signal if the animal 300 is in the defined position in the captured image 301 and the defined object 501 is in the captured image 301. The defined object 501 may be a wide variety of objects, including but not limited to toys, leashes, harnesses, and/or bedding. The controller 140 may be configured to determine the defined object 501 is in the captured image 301 using a variety of object recognition techniques, as previously described. In some embodiments, the controller 140 is configured to define the defined object 501 based on an imaging signal from the imaging device(s) 120A, 120B, allowing a user to define the exact object that is to be in the captured image 301. In some embodiments, the controller 140 is further configured to determine that the animal 300 has the defined object 501 in a defined object location in the captured image 301, such as in the animal's mouth below the nose 302E, and is configured to only output the reward signal if the defined object 501 is in the captured image 301 and also in the defined object location in the captured image 301.

From the foregoing, it should be appreciated that the animal training device 100 provided according to the present invention can be used to train an animal with little, if any, user involvement required. The animal training device 100 can also allow a user to interact with the animal during the training protocol and is customizable to train the animal in a variety of different ways. Thus, the animal training device 100 provided according to the present invention can be used to maintain a training routine for an animal, increasing the chance of successfully training the animal, without the animal's owner and/or trainer being in close physical proximity to the animal.

Figure 6:
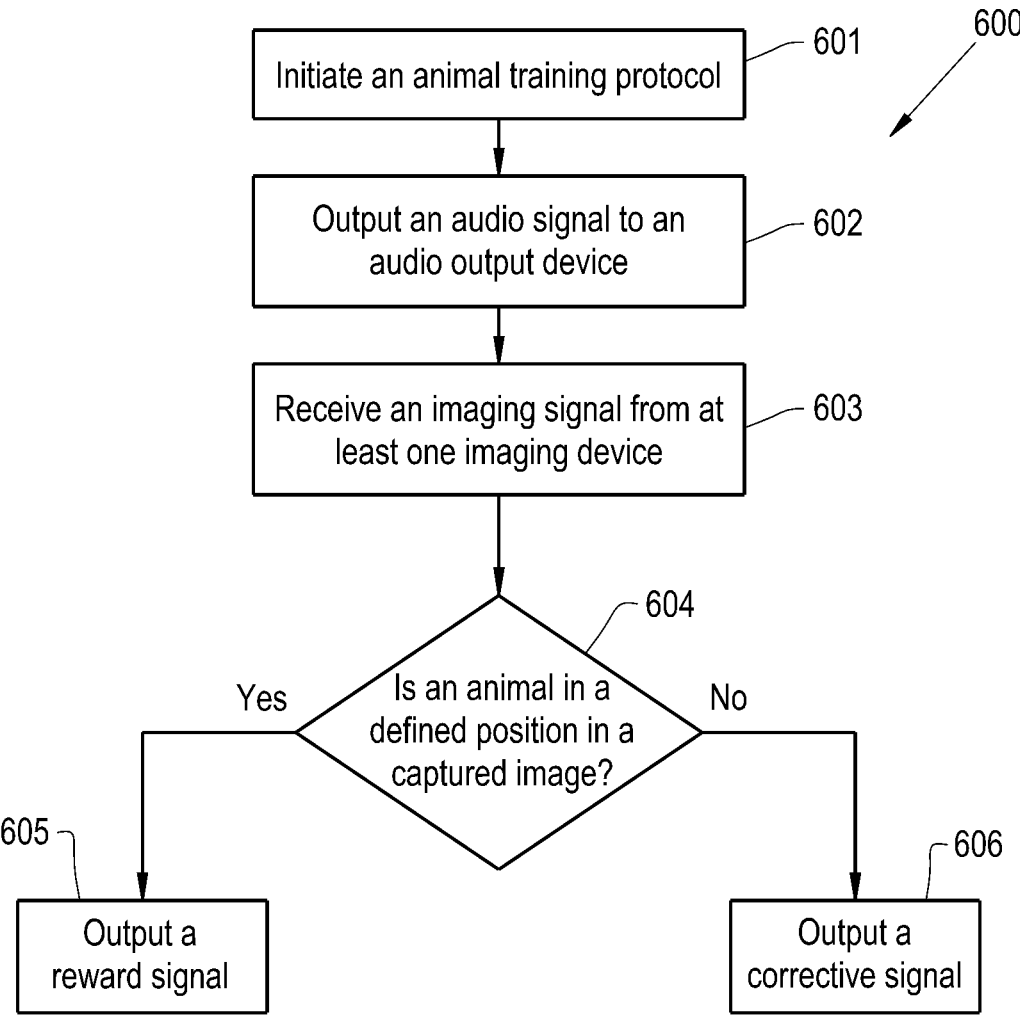
FIG. 6 is a flow chart illustrating an exemplary embodiment of a method of training an animal, provided according to the present invention.

Referring now to FIG. 6, an exemplary embodiment of a method 600 of training an animal according to the present invention is illustrated. The method 600 is performed by the controller 140 of the animal training device 100 and includes: initiating 601 an animal training protocol; outputting 602 an audio signal to an audio output device 130 so the audio output device 130 produces a training sound; receiving 603 an imaging signal from at least one imaging device 120A, 120B after outputting 602 the audio signal; analyzing 604 the received imaging signal to determine if an animal 300 is present in a captured image 301 in a defined position; and outputting 605 a reward signal to reward the animal 300 if the animal 300 is in the defined position in the captured image 301. In some embodiments, analyzing 604 the received imaging signal also includes determining if the animal 300 is not in the defined position in the captured image 301 and, if the animal 300 is not in the defined position in the captured image 301, outputting 606 a corrective signal. As the previously described controller 140 performs the method 600, the method 600 may also include any of the previously described functions of the controller 140.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present invention as come within known or customary practice in the art to which this invention pertains and which fall within the limits of the appended claims.

What is claimed is:

1. An animal training device, comprising:

a housing;

at least one imaging device associated with the housing and configured to capture an image and output an imaging signal corresponding to the captured image;

an audio output device associated with the housing and configured to receive an audio signal and produce a training sound responsively to the received audio signal; and a controller operably coupled to the at least one imaging device and the audio output device, the controller being configured to:

initiate an animal training protocol;

output the audio signal to the audio output device so the audio output device produces the training sound;

receive the imaging signal after outputting the audio signal;

analyze the received imaging signal to determine if an animal is present in the captured image in a defined position, the defined position comprising a defined orientation;

output a reward signal to reward the animal if the animal is in the defined position in the captured image; and determine the animal is not in the defined position in the captured image and output a corrective signal responsively to determining the animal is not in the defined position, wherein the corrective signal causes a remote device worn by the animal to produce a corrective sound that differs from the training sound and/or causes the remote device worn by the animal to perform an action that promotes corrective behavior by the animal, wherein the controller is configured to determine the animal is not in the defined position in the captured image by recognizing a plurality of anatomical features of the animal in the captured image and comparing a position of at least one of the anatomical features of the animal in the captured image to a position of at least one other one of the anatomical features of the animal in the captured image.

2. The animal training device of claim 1, further comprising at least one reward storage reservoir disposed in the housing and configured to store at least one reward and a reward distributer associated with the at least one reward storage reservoir and operably coupled to the controller, the housing having a reward opening formed therein, the controller being configured to output the reward signal to the reward distributer so the reward distributer distributes the at least one reward through the reward opening.

3. The animal training device of claim 2, wherein the at least one reward storage reservoir comprises a plurality of reward storage reservoirs, each of the reward storage reservoirs being configured to store a specific reward type therein.

4. The animal training device of claim 3, wherein each of the reward storage reservoirs is coupled to a reward chute that is coupled to the reward opening.

5. The animal training device of claim 2, wherein the at least one reward comprises at least one of a toy or an edible item.

6. The animal training device of claim 2, wherein the controller is configured to also output the reward signal to the audio output device so the audio output device produces a reward sound.

7. The animal training device of claim 6, wherein the controller is configured to generate a reward sound signal based on a received sound signal and output the reward sound signal to the audio output device to produce the reward sound.

8. The animal training device of claim 1, wherein the controller is configured to receive a defined position image signal corresponding to the defined position and define the defined position based on the received defined position image signal.

9. The animal training device of claim 8, wherein the controller is configured to receive the defined position image signal from at least one of the at least one imaging device or a remote imaging device.

10. The animal training device of claim 1, further comprising a communication module operably coupled to the controller and configured to receive signals from the remote device, output received signals from the remote device to the controller, receive controller signals from the controller, and output the received controller signals to the remote device.

11. The animal training device of claim 10, wherein the controller is configured to also output the reward signal to the remote device via the communication module.

12. The animal training device of claim 10, wherein the at least one imaging device is operably coupled to the communication module and the communication module is configured to receive the imaging signal and output the received imaging signal to the remote device.

13. The animal training device of claim 10, wherein the communication module is configured to wirelessly receive signals from the remote device and wirelessly output the received controller signals to the remote device.

14. The animal training device of claim 1, wherein the at least one imaging device comprises at least one of an optical camera and a thermal camera.

15. The animal training device of claim 1, wherein the controller is configured to wait a defined training time period after outputting the audio signal to the audio output device before outputting the corrective signal.

16. The animal training device of claim 1, wherein the remote device is configured to produce the corrective sound responsively to receiving the corrective signal.

17. The animal training device of claim 1, wherein the controller is further configured to receive a reward selection signal corresponding to a specific reward and generate the reward signal to correspond to the specific reward based on the received reward selection signal.

18. The animal training device of claim 1, wherein the controller is further configured to analyze the imaging signal to determine if a defined object is in the captured image and only output the reward signal if the animal is in the defined position in the captured image and the defined object is in the captured image.

19. The animal training device of claim 1, wherein the captured image is a single image capture.

20. The animal training device of claim 1, wherein the output corrective signal causes the remote device worn by the animal to deliver an electric shock to the animal.

* * * * *